(No Model.)
W. H. JOHNSTONE.
CONDUIT FOR ELECTRIC WIRES.
No. 274,611. Patented Mar. 27, 1883.
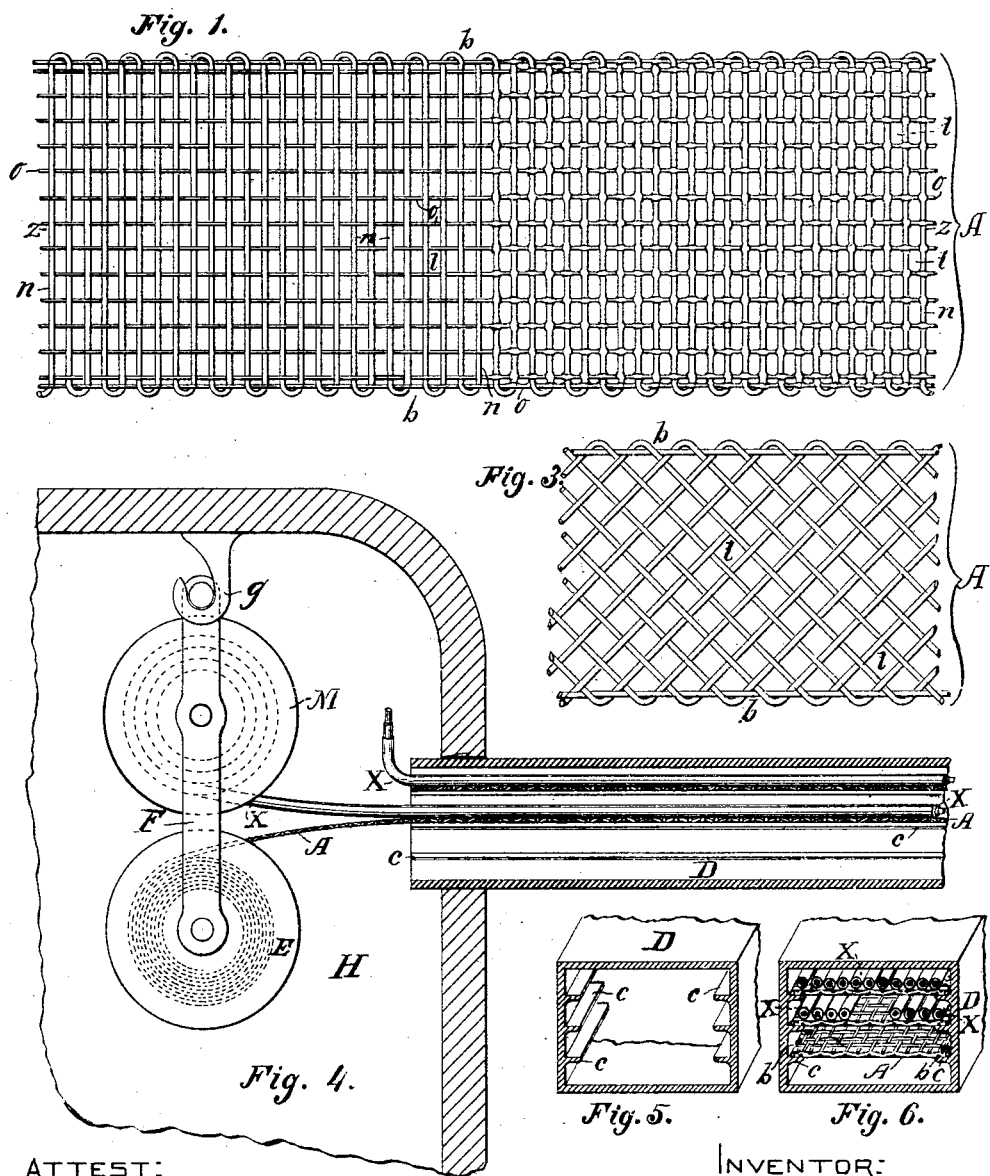

UNITED STATES PATENT OFFICE.

WILLIAM H. JOHNSTONE, OF PHILADELPHIA, PENNSYLVANIA.

CONDUIT FOR ELECTRIC WIRES.

SPECIFICATION forming part of Letters Patent No. 274,611, dated March 27, 1883.

Application filed February 1, 1883. (No model.)

*To all whom it may concern:*

Be it known that I, WILLIAM HAMPDEN JOHNSTONE, a citizen of the United States, and a resident of the city of Philadelphia, in the State of Pennsylvania, have invented certain new and useful Improvements in Conduits for Electric Wires, described in the following specification, reference being had to the accompanying drawings, in which—

Figure 1 represents a plan view of portion or piece of woven-wire fabric forming a part of my invention; Fig. 2, a longitudinal section at the line $z\ z$, Fig. 1, of the same as being passed between rollers for the purpose of flattening the said fabric; Fig. 3, a plan view of a portion of braided-wire fabric forming a modification of a part of my invention; Fig. 4, a vertical longitudinal section of an end portion of a conduit for electric wires, and portion of a working-pit, showing a manner of introducing the wire fabric, substantially as shown in Figs. 1, 2, or 3, into the conduit to therein form a supporting-shelf for electric wires thereupon; Fig. 5, a vertical cross-sectional perspective of a portion of conduit adapted to receive, but without my invention therein; and Fig. 6, a like sectional perspective of a portion of a conduit with my invention and several electric wires in place therein.

In the various figures referred to in this specification, and in which like characters refer to similar parts, A is a portion of wire fabric made in accordance with my invention, and is designed to be woven, Figs. 1 and 2, or braided, Fig. 3, of any material suitable for the purpose for which it is intended in my invention. I preferably make this fabric of iron wire, and when in use it is designed to be supported at its edges $b\ b$ upon suitable ribs or flanges, $c$, arranged longitudinally along the interior side walls of a conduit-casing, D, Figs. 4, 5, 6, thus forming a continuous shelving for electric wires X X X, running through the conduit. By producing this woven or braided wire shelving in long lengths and winding it upon a suitable reel, E, whereby it shall be adapted, when required, to be set in a suitable frame, F, suspended from hooks $g$ at the ceiling of a working-pit, H, in which a conduit-casing, D, terminates, (or the reel may be supported in any other suitable manner,) this wire shelving can be drawn into its place in the conduit-casing D, as desired, from off the reel E by any suitable known means. The casing D of the conduit being of such material as shall be a conductor of electricity, (preferably of cast-iron,) and the shelving A being also an electrical conductor, it is obvious that all induced currents of electricity produced by the passage of the primary currents along the insulated wires resting on the shelves A in the conduit will be immediately grounded throughout the whole length of such conduit. It is well known to those conversant with the science or art to which my invention relates that the great impediment to electrical success in the arrangement of electric wires together in as close proximity as would be desirable in a conduit therefor, known as "induction," is almost wholly, if not entirely, overcome by providing the electric wires with their insulation with a metallic covering having ground connection. Now, while I do not confine myself to any specially-devised wire or covering for the same to overcome this difficulty of induction, I can use any improved conductor, or a simple insulated wire, which resting on the wire shelving A in the conduit D, all escapement or induced currents of electricity (which always takes the shortest route to the earth through the course of least resistance) will be broken up and sent in every direction along the strands or wires of the shelving A at right angles or diagonally across the conduit, and the conduit-casing D to the earth.

With a view to producing a smooth, even surface on the braided or woven fabric for the shelves A, so as to lessen the friction or abrasion of the electric wires in being drawn endwise thereupon, I flatten the fabric, especially at the intersection of the wires of which such fabric is composed, either by passing such wire fabric between rollers arranged as shown at J and K, Fig. 2, adjusted at a suitable distance apart therefor, or in any other known practicable manner. The meshes or interstices $l$ in the shelving permit water or dirt to pass through the same upon the bottom of the conduit.

With a view to resisting corrosion, the wire shelving A, if made of iron, may be galvanized previous to its being put into place in the conduit. Although the shelf or shelves A can be drawn into place in the conduit, and the electric wires subsequently drawn into the conduit upon such shelf or shelves, still, when desired, a shelf can have one or more electric wires clamped or otherwise secured to its forward end, and such shelf and wire or wires be drawn into place at one and the same operation. In Fig. 4 is shown the same frame, F, that carries the reel E, from which the flexible wire shelf A is unwound in being drawn into the conduit. I also show an electric-wire bobbin or bobbins, M, from which the electric wire X is unwound at the same time with the uncoiling of the wire shelf A as they are being together drawn into the conduit.

When the shelf A is woven as shown in Fig. 1, I prefer that the wire $n$, which constitutes the woof of the fabric, shall be larger than the wires $o$, forming the warp of such fabric, as the wires $n$, making the woof, have to sustain the weight of the electric wires thereupon, while the use of the wires $o$, forming the warp, is to preserve the distances apart of the woof while the fabric is being drawn into place in the conduit.

I do not confine myself to any particular size or shape of wire of which the shelf shall be made, though under some circumstances I may prefer to make use of flattened or ribbon-shaped wire, either in part or in whole, in making such flexible shelf A.

It will be observed that by the use of the wire shelving, whether the same is braided or woven, I attain the desideratum of an endless shelf, or one of any desired length, which will permit water of condensation easily to drop through it. The wires forming the braided or woven shelf are of course round wires, and such being their structure condensed moisture will run off almost as quickly as it collects. In case the shelf after having been braided or woven is passed through a pair of rolls to flatten the joints, or even to flatten the wires between the joints, the process will nevertheless result in leaving a rounded edge to the wire, even though its top and bottom may be flattened. Since the wire is thus left rounded on its edges, whether it be rolled or not, it is apparent that it will always present a sloping edge for any surface-water to escape. There is thus presented a better device than a punched plate for conveying the water off, as in such case the plate is flat and there are no sloping edges to lead water to drip.

What I claim as new and of my invention is—

1. In combination with the conduit D, for conducting electric wires, the wire shelf A, for supporting electric conductors, sustained by suitable supports, $c$, substantially as and for the purposes described.

2. In combination with the conduit D, provided with side supporting ribs, $c$, the woven or braided wire shelving A, substantially as and for the purposes described.

3. In combination with the conduit D, for conducting the electric wires, the woven supporting-shelf A, rolled and flattened, as described, and sustained by suitable supports, $c$, substantially as and for the purposes set forth.

4. In a conduit for electric wires, a wire supporting shelf made of woven or braided wire fabric, having the intersections of the wire of which such fabric is formed flattened in the manner substantially as described.

Signed by me this 24th day of January, 1883.

WM. HAMPDEN JOHNSTONE.

Witnesses:
 JAMES THORN GOODFELLOW,
 GEO. R. THOMPSON.